United States Patent [19]
Yie

[11] Patent Number: 5,927,329
[45] Date of Patent: Jul. 27, 1999

[54] APPARATUS FOR GENERATING A HIGH-SPEED PULSED FLUID JET

[75] Inventor: Gene G. Yie, Auburn, Wash.

[73] Assignee: Jetec Company, Auburn, Wash.

[21] Appl. No.: 08/866,428

[22] Filed: May 30, 1997

[51] Int. Cl.⁶ .................................................. F16K 31/12
[52] U.S. Cl. ............................... 137/624.13; 137/624.14; 251/30.01; 239/570
[58] Field of Search ...................... 137/624.13, 624.14, 137/624.15; 251/48, 25, 30.01; 239/583, 570

[56] References Cited

U.S. PATENT DOCUMENTS

| | | |
|---|---|---|
| 3,494,376 | 2/1970 | Doeringsfeld et al. ............ 137/624.14 |
| 4,534,427 | 8/1985 | Wang et al. . |
| 4,555,872 | 12/1985 | Yie . |
| 4,747,576 | 5/1988 | Saito et al. ............................ 251/25 X |
| 5,092,362 | 3/1992 | Yie . |
| 5,117,872 | 6/1992 | Yie . |
| 5,186,393 | 2/1993 | Yie . |
| 5,799,688 | 9/1998 | Yie ..................................... 137/505.13 |

*Primary Examiner*—Kevin Lee
*Attorney, Agent, or Firm*—Pauley Peterson Kinne & Fejer

[57] ABSTRACT

An apparatus and method for generating a high-speed pulsed fluid jet wherein the apparatus has a valve cylinder that forms a valve cavity. A piston is slidably mounted within the valve cavity. A plunger with an internal chamber is fixed with respect to the piston. The internal chamber communicates with the valve cavity. An end plug is sealably mounted with respect the plunger. The end plug has a bore through which a valve stem is sealably and slidably mounted. The valve stem is mounted to slide within the internal chamber, the bore of the end plug and a valve chamber of a cylinder. The valve chamber communicates with a pressurized fluid source. A valve poppet is attached to the valve stem. A spring or compressed gas is used to exert a bias force which normally urges the valve poppet into a releasable seated position within a valve port of an end plug which is sealably mounted with respect to a fluid cylinder that forms the valve chamber.

15 Claims, 9 Drawing Sheets

APPARATUS FOR GENERATING A HIGH-SPEED PULSED FLUID JET

BACKGROUND OF THE INVENTION

1. Field of the Invention

This invention relates to a valve apparatus and method for pressurizing fluids, such as gas or liquid, which can then be quickly released or dumped when over-pressurized, to transform continuous fluid flow into pulsed waterjets without significant energy losses. This invention is particularly suitable for use with liquids, such as water, that operate at relatively high pressures and generate high-speed pulsed fluid jets which have high impact energy levels and which travel great distances.

2. Description of Prior Art

The utility of high-speed fluid jets, such as waterjets, is well known. Continuous waterjets having various flow rates and velocities are used in a wide range of applications. One basic process for generating a continuous waterjet is relatively simple, wherein water is transported to a suitable pump to raise the operating pressure, the pressurized water is then communicated through tubes or hoses to a suitable nozzle, and the pressurized water is ejected through the nozzle to form a coherent waterjet. The particular type of conventional system can vary depending upon the different complexities associated with an intended application. The discharge velocity and the energy content of the waterjet can vary among different conventional systems, and are often a function of the pressure and the power input of the system.

Conventional waterjets are used in different civil, commercial and industrial applications. One common use is for firefighting processes, in which relatively large diesel engine-driven crankshaft pumps are used to pressurize water at moderately high pressures, such as at several hundred pounds per square inch (psi), and at relatively high flow rates. In firefighting operations, it is important for a nozzle, such as a long and smooth nozzle, to generate a coherent waterjet capable of traveling a significantly long distance. High-speed waterjets are also created by relatively compact hand-held jetting lances, for cleaning and blasting industrial structures and equipment at water pressures up to about 35,000 psi. Water can be pressurized to pressures up to about 60,000 psi, and discharged at supersonic velocities, with pressure intensifiers. Such waterjets are used in factories, normally with automated robots, to cut a wide variety of materials such as paper products, leathers, fabrics, food items and many other industrial products.

Conventional systems also mix selected particulate materials, such as industrial abrasives, to a high-speed waterjet to generate what is known as an abrasive waterjet (AWJ) for cutting relatively hard material such as glass, plastics, laminates, composite, alloys, metals, rock and concrete. Experiments are now being conducted with water-based abrasive slurries, for generating abrasive waterjets; such processes involve direct or indirect pressurization of abrasive slurries and discharging pressurized slurries through a nozzle, to form a high-speed slurry jet. The relatively high velocities achieved by the abrasive particles offer a slurry jet with unmatched cutting capabilities.

Waterjet systems can be characterized by two basic system parameters: system pressure and energy output. In firefighting applications, a waterjet system pressure is relatively low but the mass flow rate is relatively high, and thus the emphasis of the system is directed toward delivery distance of the waterjet. In waterjet material-cutting applications, the system has quite opposite requirements wherein the mass flow rate is relatively low but the system pressure is relatively high. In both applications, the waterjet energy is basically defined as a product of mass flow rate and system pressure. The system equipment delivers energy at a relatively steady rate, which is a common characteristic of continuous waterjet systems. Such continuous waterjet systems can be modeled as electrical systems wherein electrons are equivalent to water, voltage is equivalent to water pressure, current is equivalent to flow rate, electrical conductors are equivalent to hoses or conduits, electrodes are equivalent to water nozzles, and an electrical discharge at an electrode is equivalent to a waterjet.

Relatively powerful electrical discharge can be produced by raising a voltage across two electrodes, particularly if relatively large capacitors are used to store a large amount of energy and then quickly discharge the energy. A similar situation exists in waterjet systems. In many waterjet applications, it is very desirable and advantageous if the waterjet energy can be stored and ejected through a nozzle in a pulsed jet rather than a continuous jet. It is quite desirable in many applications to deliver a relatively large amount of waterjet energy to a target material, in a concentrated fashion and within a relatively short time duration. This is the realm of pulsed waterjet (PWJ) technology.

The benefits of relatively high-speed PWJ have been recognized and appreciated in mining applications, due to the particular nature of rock and minerals. Such porous materials are known to have relatively high compressive strength but relatively low tensile strength, so that the water can produce fractures in such materials. Continuous waterjets applied in a conventional fashion, even at relatively high pressures, result in localized failure, such as formation of slots and kerfs. On the other hand, pulsed waterjets can caused rocks and minerals to fail in a more pronounced manner as compared to that possible with continuous waterjets operating at a same energy level. If a sufficiently large slug of relatively high-speed waterjet is delivered to rock material in a relatively short time, the rock material can fail catastrophically, in a manner similar to explosive forces. Even in ordinary waterjet cleaning and blasting operations, discrete waterjets are preferred over continuous waterjets, for efficiently and effectively removing contaminants.

Other lesser known applications exist where suitable pulsed waterjets could significantly impact the operation, for example, pulsed waterjets may be quite suitable for injecting materials into the ground for applications such as in situ bioremediation. However, pulsed waterjet processes are often quite involved and many have been only laboratory curiosities, never reduced to practice.

Pulsed waterjet processes can be characterized by other system parameters, such as pulsation factors which define the pulse length, spacing and other features. Such pulsation factors may be relatively important in many applications and are governed by the particular system application and type of pulsed waterjet generated.

Many different methods can be used to generate pulsed fluid jets. A relatively simple method is to use a pump with an unbalanced pressure discharge, such that a jet discharged from a nozzle has a naturally fluctuating velocity, if the distance between the pump and the nozzle is not too great. Another conventional method employs a nozzle that segments a continuous stream fluid jet into discrete slugs. Impact extrusion, pressure extrusion and cumulation methods for waterjetting have been conventionally used to generate relatively high-power pulsed waterjets, for applications such as fracturing rock and concrete.

U.S. Pat. No. 4,074,858 teaches a pressure extrusion process for generating relatively high-power and relatively high-pressure pulsed waterjets capable of fracturing concrete pavement. Compressed gas, such as nitrogen, is used to store energy. Two sets of pistons are used to cock and drive a plunger for transferring the stored energy to the fluid, such as water. Hydraulic fluid is often the working fluid for the required power input. A fast-acting valve is used to fire an oil port in a controlled fashion and thus the water is discharged from a nozzle by a fast-traveling plunger within a high-pressure cylinder. U.S. Pat. No. 4,074,858 discloses a plunger that must first pressurize water prior to forming a waterjet at a nozzle, even though the pressure within a cylinder may not be steady during plunger travel and may not even be critical to the end result. Such process works relatively well but is rather limited in usefulness. One limitation relates to the speed of the plunger which inherently depends upon working fluid flow, which is situated between the compressed gas and a power piston. Oil is inherently slower than gas in similar flow conditions and oil velocity is affected by different viscosities. Another limitation relates to an absence of a water valve at an outlet, to prevent leakage through the nozzle while charging. Water leakage can be quite substantial in vertical, downward applications of pulsed waterjet processes, and partial filling of the chamber can result in undesirable shocks and performance losses.

U.S. Pat. No. 4,190,202 teaches a process for generating high-power and high-pressure pulsed waterjets, wherein a restrictive oil port is eliminated and a cocking piston is moved into a same chamber with a power piston, to increase the piston and plunger speed, and to improve firing control, a relatively difficult task in high-power pulsed-jet processes. Such process also allows the cocking gas to be evacuated prior to firing, thus improving energy transfer from gas to water. However, there is still a need for a suitable water valve that prevents nozzle leakage prior to firing, and there is still the need for eliminating premature firing.

U.S. Pat. No. 4,607,792 teaches a pulsed waterjet produced by impacting water with a reciprocating piston within a reciprocating cylinder equipped with a cumulation nozzle. Pressurized gas supplies necessary energy to power the piston and inertia of the piston along with reciprocating motion of the nozzle cylinder produces oscillating action. It is possible to produce rates of up to several pulses per second with such process. U.S. Pat. No. 4,607,792 is a good example of one of many processes for generating pulsed waterjets that have relatively low mass per pulse but relatively high repetitive rates. Such process can produce pulse jets at relatively high velocities, if the power input is high and the cumulation nozzle is adequately constructed in terms of internal profile and smoothness, which are two relatively difficult manufacturing tasks. In order to accelerate a piston of significant mass to a relatively high velocity within a relatively short time and distance, explosives or detonation of a fuel-air mixture is used, neither of which is desirable in many applications. If compressed gas is used, only compressed air is practical and only when delivered at relatively low pressures, due to cost considerations. As a result, the pulsed waterjet generated with air compressors has relatively low velocity and cannot generate impact forces necessary to fracture rock and concrete, for example. Furthermore, the absence of a restricting valve to minimize leakage at the nozzle can be a disadvantage with the invention taught by U.S. Pat. No. 4,607,792.

U.S. Pat. No. 4,573,637 teaches a pulsed-jet process which uses energy stored in a high-pressure fluid to generate a high-speed jet through a cumulation nozzle and an oscillating self-actuating valve. Liquid such as water is relatively incompressible, even at high-pressures, and the amount of energy available which can be released to generate and sustain high-speed jet pulses is limited. Even when using a cumulation nozzle, energy contained in each pulsed waterjet is not high enough to adequately fracture or damage material such as rock and concrete.

Other conventional pulsed waterjet devices and processes are available, which use cumulation nozzles that have hyperbolic or other internal fluid passages for accelerating fluid flow velocities. The valves for such nozzles are relatively difficult and expensive to manufacture and there is no particular design to which manufacturers conform. Many conventional cumulation nozzles used in pulsed waterjet processes lack scientific evidence to substantiate their virtues, thus, a survey of conventional devices and processes show that many high-powered pulsed waterjet processes only exist as laboratory projects. Many unresolved difficulties are associated with the equipment design. Practical devices are not commercially available for particular jobs, such as fracturing rock and concrete. There is an apparent need for an apparatus and method for producing a high-powered pulsed waterjet with a relatively inexpensive and practical device that is easy to manufacture.

SUMMARY OF THE INVENTION

It is one object of this invention to provide a rapid-acting, quick-release on-off valve for controlling a fluid passage operating under a relatively high fluid pressure, so that the fluid passage can be constructed straight and devoid of obstacles that could otherwise interfere with fluid flow and thereby cause flow turbulence.

It is another object of this invention to provide a rapid-acting, quick-release on-off valve that can be operated in an automatic, a semi-automatic or a manual mode, to open and close a fluid passage operating under a relatively high pressure and at a particular frequency.

It is another object of this invention to provide a pulsed fluid-jet generator that produces a relatively high-speed fluid jet at a wide range of pressures, power outputs and pulsation frequencies.

It is still another object of this invention to provide a process for generating a high-power, high-speed, pulsed fluid jet that can be altered to perform a wide variety of tasks which are not possible with conventionally available equipment and/or processes.

It is still another object of this invention to provide a fluid-powered apparatus and process that can be used to power other tools or to drive or launch projectiles.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

The apparatus according to this invention comprises subsystems that can be used in part, in whole or in combination with other subsystems. The subsystems include: a valve cylinder that receives system fluid; a potential energy storage system, such as compression spring or springs or compressed gas; an energy transfer system, such as a piston-plunger set; a fluid-actuated valve poppet assembly; a fluid discharge with or without a nozzle; and a valve system for regulating the fluid inlet. When used as individual components, the subsystems of this invention can act as a fluid-actuated manual-reset dump valve or a fluid actuated on-off valve. When a plurality of the subsystems are integrated with respect to each other, the apparatus of this invention can act as a pulsed fluid jet generator.

Figure 1:
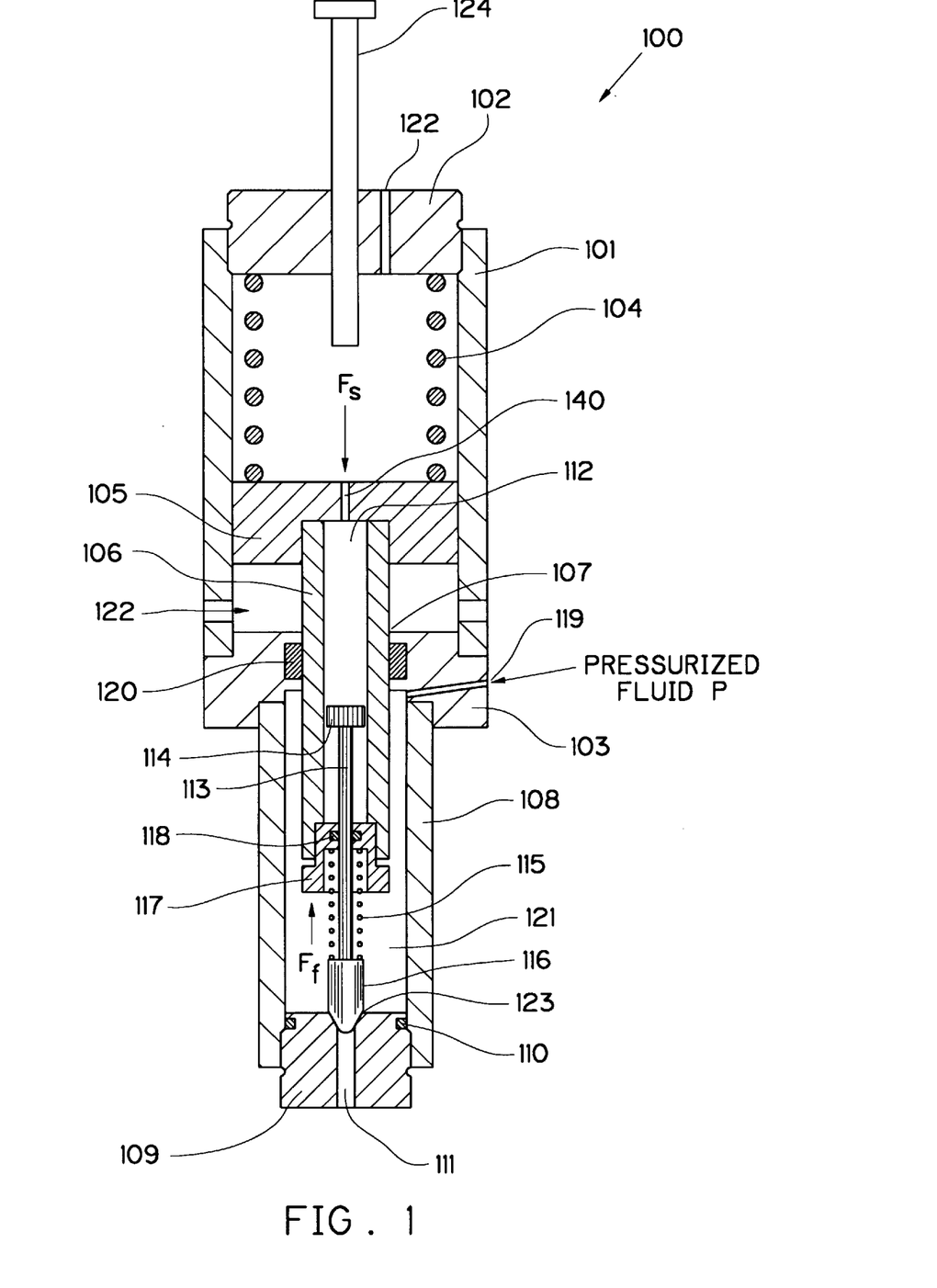
FIG. 1 is a partial cross-sectional view of a self-actuating relief valve, according to one preferred embodiment of this invention.

Referring to FIG. 1, self-actuating relief valve 100 is used to convert a preferably steady, continuous fluid flow to a discontinuous fluid flow while maintaining fluid pressures by energy storage devices or other energy storage means, such as one or more compression springs or compressed gas. Self-actuating relief valve 100 comprises valve cylinder 101 having end plug 102 preferably attached at one end portion of valve cylinder 101 and end block 103 preferably sealably secured or otherwise attached at an opposite end portion of valve cylinder 101.

Valve cylinder 101 forms a valve cavity that houses compression spring 104 and power piston 105, which is slidably mounted within the valve cavity of valve cylinder 101. Valve spring 104 preferably abuts or is otherwise mounted or fixed with respect to end plug 102 on one end and an opposite end of valve spring 104 abuts or is otherwise mounted or fixed with respect to power piston 105. Power piston 105 comprises plunger 106 extending through central passage 107 or another suitable block bore of end block 103. Plunger 106 is slidably and sealably mounted within central passage 107 of end block 103. In one preferred embodiment, one end portion of plunger 106 is fixed with respect to power piston 105. Plunger end plug 117 is sealably mounted with respect to an opposite end portion of plunger 106, such as shown in FIG. 1. Plunger end plug 117 is preferably attached to an end portion of plunger 106 which is housed within valve chamber 121. One end portion of end block 103 is fixed or otherwise attached with respect to valve cylinder 101 and an opposite end portion of end block 103 is fixed or otherwise attached with respect to fluid cylinder 108. Outlet plug 109 is sealably attached to or mounted with respect to an end portion of fluid cylinder 108, which is opposite the end portion of fluid cylinder 108 that is attached with respect to end block 103. Seal 110 prevents leakage between outlet plug 109 and fluid cylinder 108. Seal 110 is preferably constructed of a material that is capable of handling the particular pressurized fluid within the system. Outlet plug 109 comprises discharge passage 111 which is in communication with valve chamber 121, when valve 100 is in an open condition.

Internal chamber 112 of plunger 106 houses valve stem 113 which is slidably mounted to slide with respect to plunger 106. In one preferred embodiment, valve stem 113 is slidably mounted within internal chamber 112, a plug bore within plunger end plug 117, and valve chamber 121. Internal chamber 112 communicates with the valve cavity of valve cylinder 101, such as through fluid passage 140, as shown in FIG. 1. Valve stem 113 has shoulder 114 on one end portion and valve poppet 116 on an opposite end portion, as shown in FIG. 1. Shoulder 114 is preferably housed within internal chamber 112. Spring 115 is mounted about valve stem 113 and has one end portion that directly or indirectly abuts valve poppet 116 and an opposite end portion that directly or indirectly abuts plunger end plug 117. As shown in FIG. 1, valve stem 113 straddles through a bore within plunger end plug 117. Valve stem seal 118 is positioned about the hole within plunger end plug 117.

End block 103 accommodates plunger seal 120. Plunger 106 is positioned within high-pressure valve chamber 121 of fluid cylinder 108. Inlet means are used to form communication between a pressurized fluid source, such as a compressor discharge, a vessel outlet or the like, and valve chamber 121. In one preferred embodiment, the inlet means comprise fluid inlet 119 of end block 103. However, it is apparent that the inlet means may also comprise any other conduit, bore, valve, control system or other mechanical device known to those skilled in the art, which continuously or intermittently introduces a working fluid into valve chamber 121. Valve chamber 121 preferably but not necessarily has a circular cross section. Valve cylinder 101 preferably forms vent 122 at one or more locations.

Still referring to FIG. 1, pulsating or self-actuating relief valve 100 of this invention is shown in a normally closed position when there is no operating fluid flow. Bias means are used to indirectly or directly urge valve poppet 116 into a releasable seated position within discharge passage 111. Power piston 105 is normally urged downward, relative to the direction shown in FIG. 1, by a bias force $F_s$ within compression spring 104. Compression spring 104 may be a coil spring, as shown in FIG. 1, a leaf spring or any other spring or bias element that provides bias force $F_s$. In FIG. 1, valve stem 113 is shown at a lowest or bottom-out position and valve poppet 116 is seated within valve port 123 and thereby closes discharge passage 111, when the valve is in a normally closed position. Spring 115 preferably exerts a moderate closure bias force that urges valve poppet 116 in a seated position within valve port 123.

When pressurized fluid, such as water, enters valve chamber 121, the pressurized fluid exerts fluidic forces on valve plunger 106 and thereby forces valve plunger 106 upward, relative to the direction shown in FIG. 1, against spring bias force $F_s$. The magnitude of fluid force $F_f$ is governed by the equation $F_f = P(A_p - A_s)$, where P is the fluidic pressure, $A_p$ is the cross-sectional area of plunger 106, and $A_s$ is the cross-sectional area of valve stem 113. If $F_f$ is greater than $F_s$, plunger 106 will move upward against power piston 105 and compression spring 104 while valve stem 113 remains fixed and thereby seats valve poppet 116 within valve port 123. As compression spring 104 is compressed, spring bias force $F_s$ increases in magnitude.

To ensure that valve port 123 remains closed while valve chamber 121 is filled, the contact area of valve poppet 116 and valve port 123 is preferably designed to be greater than the cross-sectional area of valve stem 113. Thus, the pressurized fluid exerts a net poppet hold-down force on valve poppet 116 which is in addition to spring force.

Still referring to FIG. 1, as long as fluid force $F_f$ continues to exceed spring force $F_s$, plunger 106 can be pushed further and eventually end plug 117 will engage shoulder 114 and raise valve stem 113, relative to the orientation shown in FIG. 1. During such motion, once valve poppet 116 becomes unseated from valve port 123, discharge passage 111 opens. When valve poppet 116 is raised and exposed to the pressurized fluid, the pressurized fluid exerts force on valve stem 113 and pushes it upward into internal chamber 112. The magnitude of the force necessary to accomplish such motion is a product of the fluid pressure P and the cross-sectional area $A_s$ of valve stem 113. Ultimately, valve poppet 116 contacts plunger end plug 117 and stops. However, as soon as discharge passage 111 opens, fluid within valve chamber 121 discharges outward and a pressure drop occurs. Consequently, fluid force $F_f$ drops rapidly and causes plunger 106 to move downward with valve stem 113 and valve poppet 116. When valve poppet 116 contacts valve port 123, discharge passage 111 again closes and thereby completes one cycle of valve operation. The cycle of valve operation is repeated as long as pressurized fluid is supplied to valve 100. The cycling rate is preferably governed by design of valve 100 and by the flow rate of the fluid. Increasing the flow rate increases the cycling frequency.

Figure 2A:
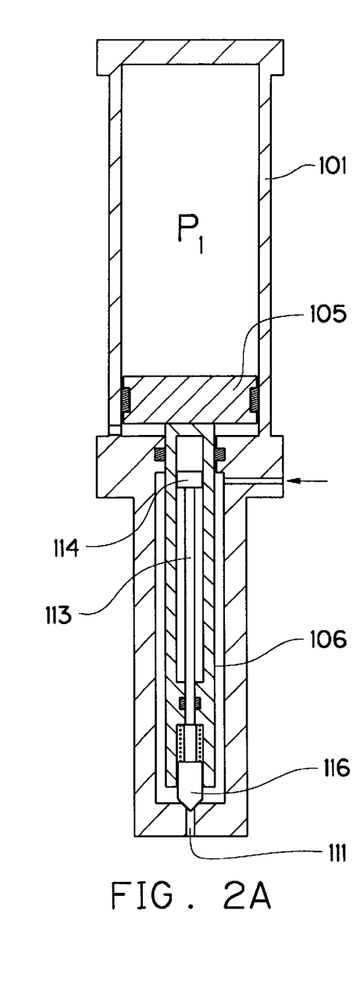
FIGS. 2A–2D are partial cross-sectional views showing positions of internal valve ports during one cycle of operation of a pulsating valve, according to one preferred embodiment of this invention.
Figure 2B:
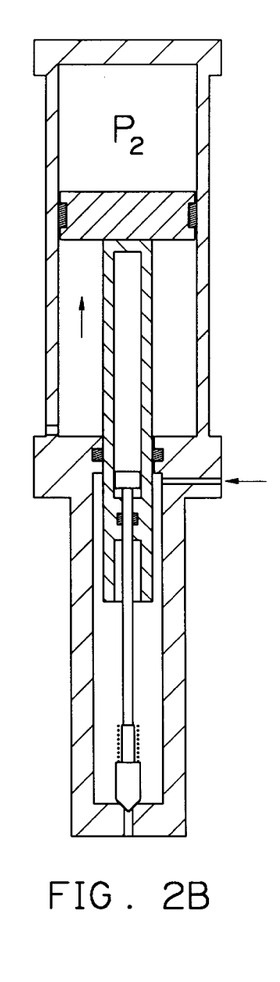
Figure 2C:
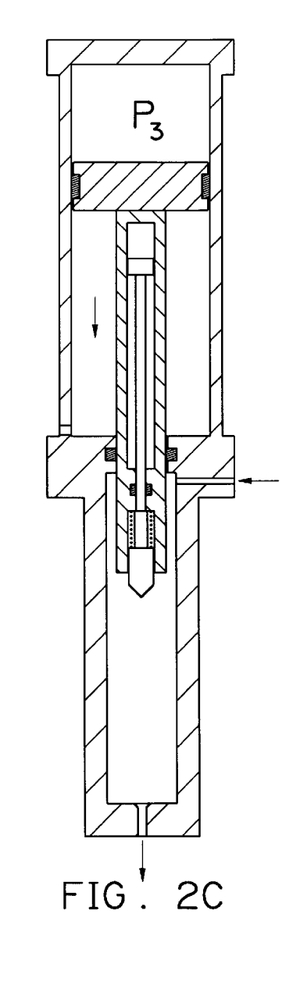
Figure 2D:
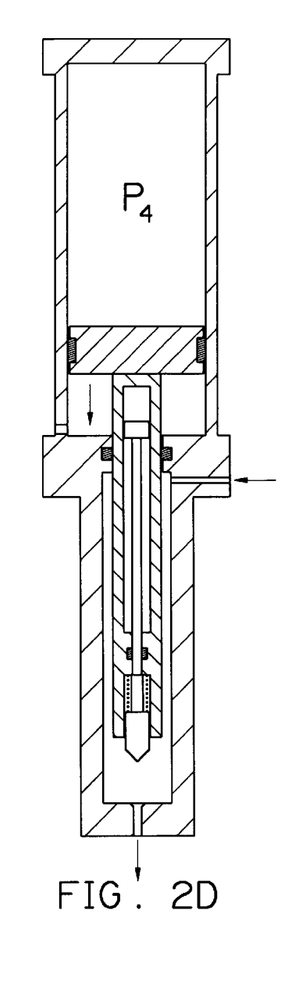

The operating sequence of valve 100 of this invention can be better understood by referring to FIGS. 2A–2D, which show different positions of internal valve ports during one cycle of operation. As shown in FIG. 2A, compressed gas $P_1$ is used as energy storage for the bias means, in lieu of compression spring 104 as shown in FIG. 1. FIG. 2A shows valve 100 in a closed position, which represents a start point or an end point of an operating cycle. FIG. 2B shows a position wherein valve chamber 121 is filled with a system fluid and plunger 106 is pushed upward, relative to the orientation shown in FIGS. 2A–2D, and is about to engage shoulder 114 of valve stem 113. FIG. 2C shows valve 100 in a position wherein valve poppet 116 is forced all of the way upward and is about to begin travel downward along with plunger 106. The compressed gas at pressure $P_3$ is at a minimum volume and exerts a bias force upon power piston 105 pushing power piston 105 downward. FIG. 2D shows plunger 106 and the assembly of valve stem 113 near a bottom of travel and valve port 123 about to be closed by valve poppet 116.

Once valve poppet 116 contacts valve port 123, valve poppet 116 can quickly close valve port 123 and another operating cycle of valve 100 will be repeated. In such operating mode, valve 100 becomes a fluid-actuated automatic on-off valve, transforming continuous fluid flow to discontinuous pulsed fluid flow. However, in other cases, once valve poppet 116 moves to close valve port 123, if valve poppet 116 does not completely seal valve port 123 and the system fluid reaches equilibrium with the spring bias force or gas bias force and then the system fluid leaks through valve port 123. To close valve port 123 completely requires an external force applied to valve poppet 116. Reset rod 124, as shown in FIG. 1, can be used to provide such external force. By pushing power piston 105 with reset rod 124, the fluid equilibrium can be broken at valve port 123, in order to close discharge passage 111. Thus, this invention can operate as a pressure relief valve with a manual reset.

Valve 100 of this invention can be set with compression spring 104 or a compressed gas at a force level below that applied to plunger 106 from pressurized system fluid that operates to close valve port 123. When the system fluid is over-pressurized beyond a set value, a pressure relief valve opens automatically to release the system fluid and thus reduce the system pressure. Valve 100 can then remain open until manually reset with reset rod 124. However, manual reset can also be accomplished locally or remotely by other reset means, such as a solenoid, an air actuator, or another suitable manual or automatic motion-generating apparatus known to those skilled in the art.

When valve 100 of this invention is used with fluid at relatively high pressures, such as in waterjetting applications, the use of compressed gas is normally preferred over compression spring 104 to generate a bias force. If manual reset is desired, the reset is preferably accomplished with high-power actuators, such as a hydraulic actuator. By using compressed gas and a valve system that regulates the inlet flow of system fluid, valve 100 of this invention can be used as a pulsed-jet generator suitable for generating relatively high-speed pulsed fluid jets. By regulating the system fluid inlet, valve port 123 can be accurately closed in a controlled fashion.

Figure 3:
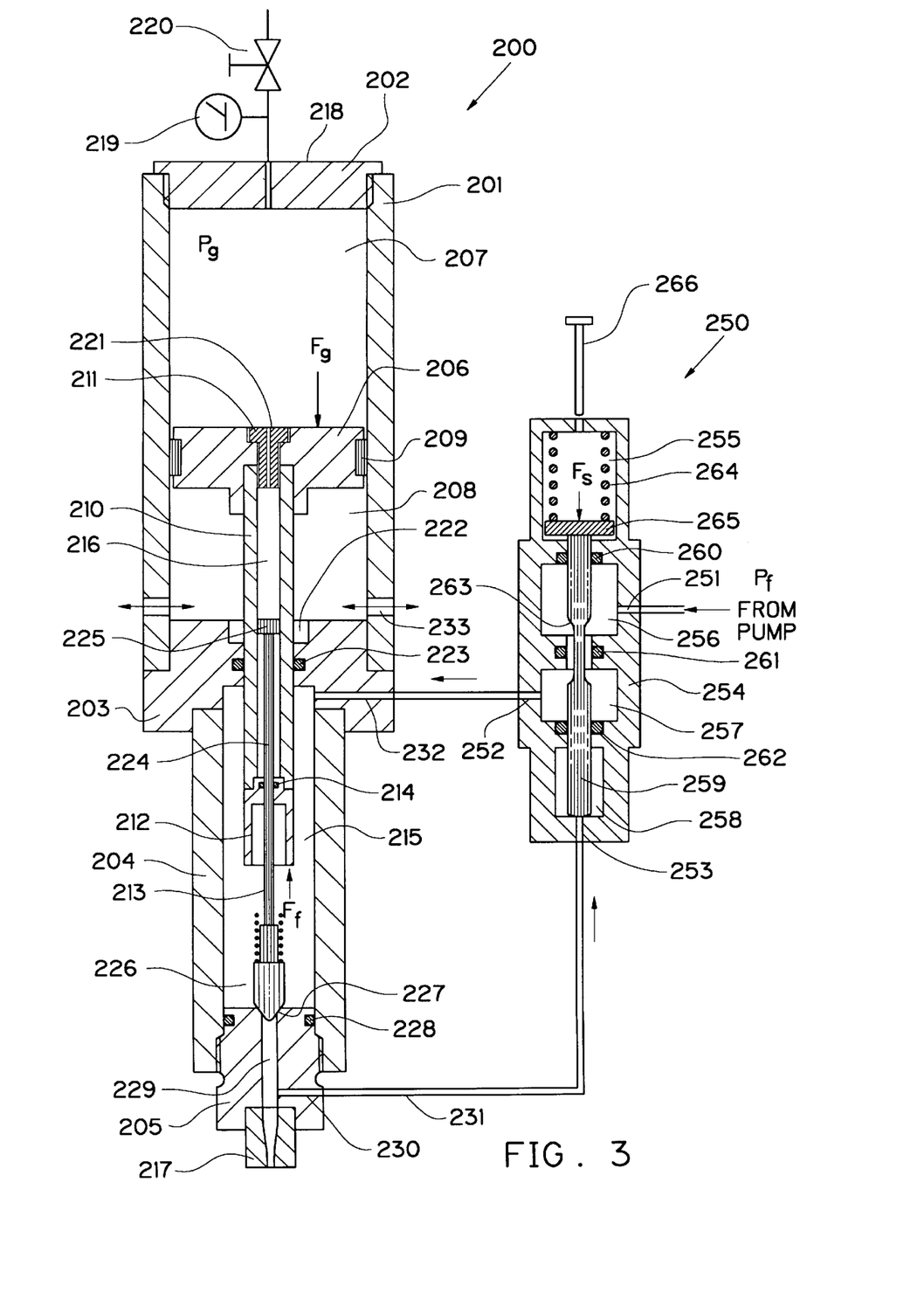
FIG. 3 is a partial cross-sectional view of a high-pressure pulsed-jet generator, according to one preferred embodiment of this invention.

Referring to FIG. 3, valve 100 is shown as a high-pressure pulsed-jet generator 200 through which relatively high-speed fluid jets can be generated, one pulse at a time, under manual control or repeatedly in an automatic mode. Pulsed-jet generator 200 of this invention comprises valve cylinder 201. End plug 202 abuts or is fixed or otherwise attached with respect to one end portion of cylinder 201, and end block 203 abuts or is fixed or otherwise attached to an opposite end portion of cylinder 201, as shown in FIG. 3. Fluid cylinder 204 abuts end block 203 on one end portion and has outlet end plug 205 abutting an opposite end portion of fluid cylinder 204. Power piston 206 is housed within a valve cavity formed by valve cylinder 201 and divides the valve cavity into gas chamber 207 and ambient chamber 208, such as with piston seal 209. Plunger 210 is preferably a hollow assembly that is attached to power piston 206, for example with threads, anchor bolt 211 or any other suitable mechanical attachment means. Plunger 210 preferably has a generally cylindrical external surface and a cylindrical internal surface that at least partially forms internal chamber 216. Plunger end plug 212 is fixed or otherwise attached to plunger 210, such as with a threaded connection. Valve stem 213 straddles across plunger end plug 212, through a central hole and through seal 214 assembly. One end portion of valve stem 213 extends into internal chamber 216 of hollow plunger 210 and another end portion of valve stem 213 extends into internal chamber 215 of fluid cylinder 204. Jet nozzle 217 abuts or is mounted within or with respect to outlet plug 205. The inlet means may also comprise external flow control valve assembly 250, which regulates flow of system fluid from an external pump to pulse-jet generator 200 of this invention.

Still referring to FIG. 3, end plug 202 is connected to valve cylinder 201, preferably but not necessarily with a threaded connection as shown in FIG. 3, or by seals or any other suitable mechanical means to form a gas-tight or hermetic seal between valve cylinder 201 and end plug 202. End plug 202 comprises inlet means, such as inlet passage 218 or any other conduit, passageway, channel or other suitable void that forms communication with gas chamber 207, for filling gas chamber 207 with a suitable fluid or gas, such as nitrogen. Pressure gauge 219 and valve 220 can be used to monitor and control fluid flow through inlet passage 218.

Anchor bolt 211 is one preferred embodiment for attaching plunger 210 to power piston 206. Anchor bolt 211 preferably comprises fluid passage 221 which is in communication with gas chamber 207 and internal chamber 216 of plunger 210. Pressurized fluid within internal chamber 216 acts upon shoulder 225 of valve stem 213. Plunger 210 straddles across end block 203, through central passage 222 and seal assembly 223, and extends into internal chamber 215 of fluid cylinder 204, and is also free to slide up and down with power piston 206. Valve stem 213 is preferably but not necessarily relatively elongated. Shoulder 225 is formed as part of or attached to an end portion of valve stem 213, as shown in FIG. 3. Shoulder 225 is housed within internal chamber 216 of plunger 210. Valve poppet 226 is attached to an end portion of valve stem 213 which is opposite shoulder 225.

Valve stem 213 is free to slide across seal 214. Valve poppet 226 is preferably constructed to seat within valve port 227 of outlet plug 205. Fluid cylinder 204 is attached or otherwise secured with respect to end block 203, such as with a threaded connection, tie rods or any other suitable mechanical means sufficient to form a fluid-tight or hermetic seal between fluid cylinder 204 and end block 203. Seal assembly 228 also forms a fluid-tight or hermetic seal between outlet plug 205 and fluid cylinder 204.

Outlet plug 205 comprises fluid passage 229 that is preferably located in a central position of outlet plug 205. Fluid passage 229 is in communication with valve port 227 and the bore within jet nozzle 217. Fluid passage 230 is in communication with fluid passage 229 and external tube 231, which is in communication with control valve assembly 250. End block 203 comprises fluid inlet 232 that is in communication with outlet 252 of control valve 250. Fluid passage 232 can be located in other elements of this invention as long as the result of introducing fluid into internal chamber 215 is accomplished.

Valve cylinder 201 comprises vent 233 at one or more locations. It is apparent that vent 233 can also be positioned within end block 203. Valve cylinder 201 is preferably attached to end block 203 by a threaded connection, anchor bolts, tie rods or any other suitable means known to those skilled in the art.

Still referring to FIG. 3, control valve assembly 250 comprises: fluid inlet 251 in communication with a discharge from a pump; fluid outlet 252; and sidelet 253 which receives fluid from tube 231. Control valve assembly 250 functions on controlling the flow of system fluid from a pump to a pulse-jet generator. In a condition where no fluid flows through tube 231, control valve assembly 250 is in an open condition. When fluid flows through tube 231, control valve assembly 250 is in a closed condition. Many different ways exist to construct a valve that functions in such manner. A particularly suitable stem valve is shown in FIG. 3.

The stem valve shown in FIG. 3 comprises valve body 254 having four integrated or connected chambers: a spring or reset chamber 255; upstream chamber 256; downstream chamber 257; and actuating chamber 258. Elongated valve stem 259 preferably straddles across all four chambers and is slidably mounted within a preferably central passage that houses three sets of seal assemblies. Stem seal assembly 260 separates reset chamber 255 from upstream chamber 256. Valve port seal assembly 261 separates upstream chamber 256 from downstream chamber 257. Stem seal assembly 262 separates downstream chamber 257 from actuating chamber 258.

Valve stem 259 preferably comprises machined-out fluid passage 263 in a middle portion of valve stem 259 that straddles valve port seal assembly 261. Reset spring 264 and spring disk 265 are housed within reset chamber 255 and are used as bias means to exert a predetermined force against one end of valve stem 259, as shown in FIG. 3. It is apparent that other springs, bias elements or pressurized gas can be used as bias means to apply a force directly or indirectly upon valve stem 259. An opposite end portion of valve stem 259 is exposed to the system fluid within tube 231. Reset spring 264 is primarily used for automatic operations and can also be replaced with compressed gas, such as shown in FIGS. 2A–2D. For manual operation, reset spring 264 or the compressed gas can be replaced by or assisted with reset rod 266 or any other suitable mechanical means for resetting valve stem 259, as previously discussed in relation to the embodiment shown in FIG. 1.

In operation, control valve assembly 250 is normally open and allows the pressurized fluid from a pump to enter upstream chamber 256 at pressure $P_f$, and then to flow through the valve port between upstream chamber 256 and downstream chamber 257, and then into high-pressure pulsed generator 200, as shown in FIG. 3. During such fluid flow, no fluid flows through tube 231 because high-pressure pulsed generator 200 is in a filling stage or a filling mode. As soon as valve port 227 opens, tube 231 fills with pressurized system fluid that forces valve stem 259 upward, with respect to the orientation shown in FIG. 3, resulting in closure of the valve port as fluid passage 263 is moved upward and beyond valve port seal assembly 261. The open position of the valve is restored when flow of system fluid within tube 231 stops and reset spring 264 pushes valve stem 259 downward, or as manual reset rod 266 is used.

Still referring to FIG. 3, high-pressure pulsed generator 200 of this invention is intended for generating a relatively high-speed pulsed waterjet with relatively high impact energy. High-pressure pulsed generator 200 of this invention functions as an energy storage device and a fast-actuating quick-release dump valve which is capable of repeated or cyclic operation. Although high-pressure pulsed generator 200 has not been precisely described as a pump or a pressure intensifier, high-pressure pulsed generator 200 of this invention could act as either a pump or a pressure intensifier. According to this invention, high-pressure pulsed generator 200 is preferably a valve which is equipped with an energy storage mechanism designed according to the pressure of the system.

During operation, system fluid such as water enters generator 200 through control valve 250, at pressure $P_f$ and thereby fills internal chamber 215. Then, valve poppet 226 closes valve port 227 and gas within chamber 207 exerts a force which pushes valve poppet 226 against valve port 227. The magnitude of such pushing force is determined by the gas pressure $P_g$ and the diameter of valve stem 213. The initial gas pressure $P_g$ within gas chamber 207 is determined by several factors, including the operating pressure of system fluid $P_f$ and the design of high-pressure pulsed generator 200. However, the gas pressure $P_g$ should not be greater than the system fluid pressure $P_f$.

Still referring to FIG. 3, as the system fluid fills internal chamber 215, the pressurized fluid exerts force $F_f$, which is a product of the system fluid pressure $P_f$ and the cross-sectional area of plunger 210, upon plunger end plug 212 and forces plunger 210 upward as valve poppet 226 closes valve port 227. As internal chamber 215 is filled, power piston 206 moves upward with plunger 210 and thereby compresses gas within gas chamber 207 and raises gas pressure $P_g$. The pressurized gas exerts force $F_g$ on power piston 206 and the magnitude of the force $F_g$ is equal to a product of gas pressure $P_g$ and the cross-sectional area of power piston 206. The two forces $F_f$ and $F_g$ are at equilibrium. As plunger 210 moves upward, end plug 212 eventually engages shoulder 225 of valve stem 224 and thereby causes valve poppet 226 to unseat from valve port 227, thereby exposing valve poppet 226 to the system fluid.

As pressure $P_f$ of the system fluid is considerably greater than gas pressure $P_g$, valve poppet 226 quickly moves up toward plunger 210. The system fluid simultaneously flows into fluid passage 229 and discharges through jet nozzle 217, preferably in the form of a relatively high-speed jet. The system fluid also simultaneously flows into tube 231 and into actuating chamber 258 and control valve 250, resulting in closure of control valve 250 and stopping the system fluid from flowing into high-pressure pulsed generator 200, thus allowing all fluid within internal chamber 215 to be discharged by plunger 210. As plunger 210 moves downward to discharge the system fluid through jet nozzle 217, forces from the gas pressure $P_g$ also act upon and assist power piston 206, and thus the pressure of the system fluid is maintained generally constant. Finally, valve poppet 226 again seats within valve port 227 and forms a seal. Fluid within fluid passage 229 and external tube 231 stops flowing and control valve assembly 250 is again ready for the next pulse. In a manual operation mode, control valve assembly 250 is reset with reset rod 266 which acts upon and pushes downward valve stem 259. In an automatic operation mode, reset spring 264 automatically reopens control valve assembly 250 and allows high-pressure pulsed generator 200 to issue the next cyclic pulse.

For high-pressure pulsed generator 200 according to this invention to function smoothly, it is important for several aspects of different components of this invention to be correctly designed. For example, it is important that valve poppet 226 properly seat against valve port 227, for reliable operation. The sealing area should be greater than the cross-sectional area of valve stem 224, for the system fluid to properly seat valve poppet 226, and yet the total valve seating force should be smaller than the force the system fluid exerts upon plunger 210. Otherwise, valve poppet 226 cannot be unseated. Thus, another important design aspect is for the gas pressure $P_g$ to be high enough to match the system fluid pressure and yet be within the operating limit for high-pressure pulsed generator 200. The gas must occupy a reasonably large volume so that the gas pressure $P_g$ does not drop excessively during expansion, which would affect power or energy of the pulsed jet. Another important design aspect relates to control valve assembly 250, which should be designed to react quickly and accurately to demands of high-pressure pulsed generator 200. Still another important design aspect relates to the assembly of valve stem 213 which should be designed to withstand high stresses from impact forces and repeated impact cycles.

Figure 4:
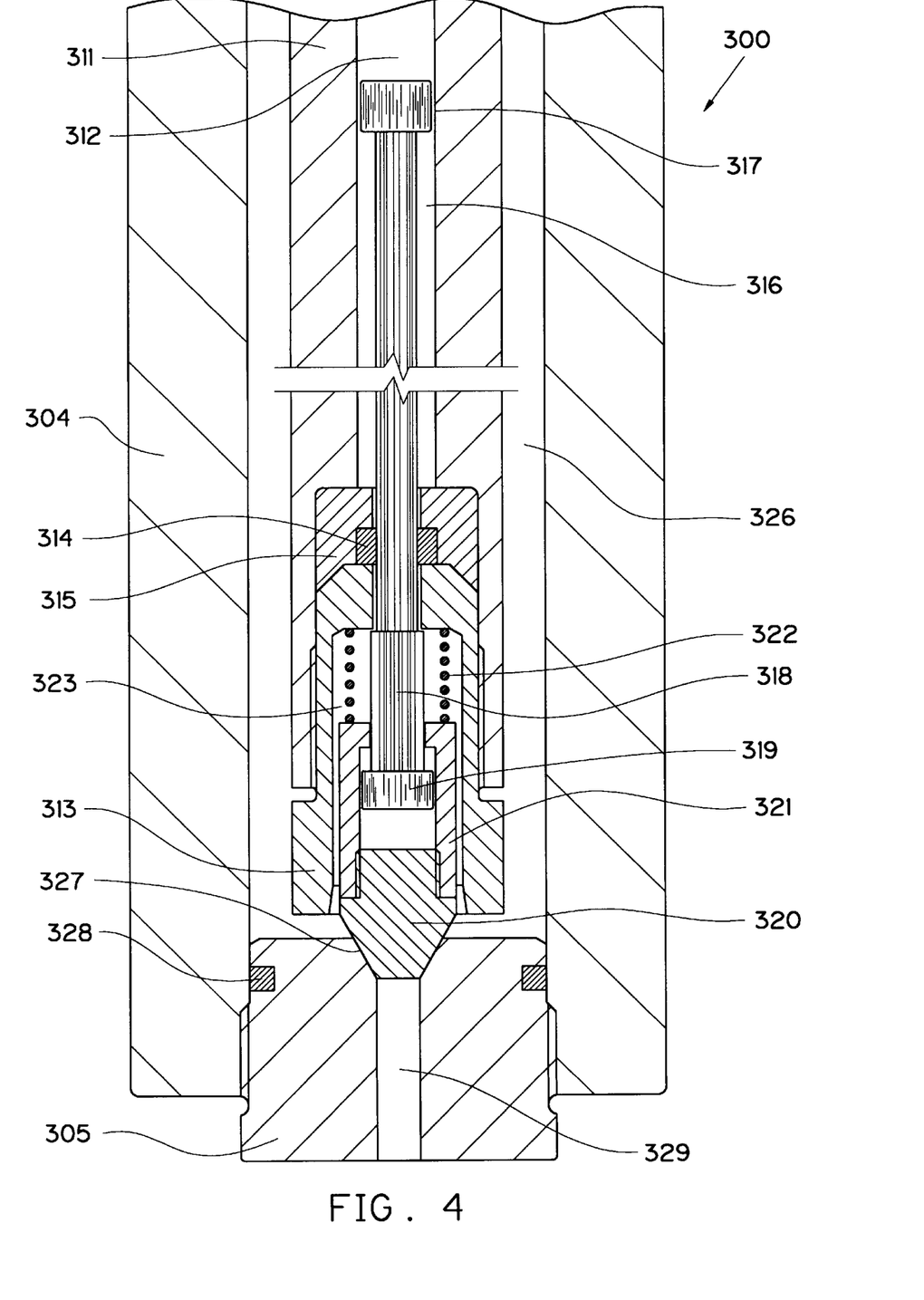
FIG. 4 is a partial cross-sectional view of a stem valve assembly, in a seated position, particularly suitable for use in a pulsed-jet generator, as shown in FIG. 3, according to one preferred embodiment of this invention.

Referring now to FIG. 4, according to another preferred embodiment of this invention, stem valve assembly 300 is shown in a normally closed position and is well-suited for use in a pulse-jet generator, such as high-pressure pulsed generator 200 shown in FIG. 3. Valve assembly 300 is preferably housed within interior chamber 312 of plunger 311. End plug 313 is sealably secured or otherwise attached with respect to plunger 311, preferably but not necessarily with a threaded connection. Stem seal 314 is mounted with seal cage 315 and forms a seal about valve stem 316.

As shown in FIG. 4, stem valve assembly 300 comprises elongated valve stem 316 with shoulder 317 positioned within interior chamber 312 and shoulder 318 and head 319 at an opposite end portion of valve stem 316. Valve poppet 320 is preferably but not necessarily detachable with respect to collar 321 which forms a cavity within which head 319 is mounted. Collar 321 straddles across head 319 and is connected to valve poppet 320 by a threaded connection or any other suitable mechanical connection. Compression spring 322 urges valve poppet 320 into a seated position with respect to valve seat 327. Compression spring 322 also absorbs initial impact forces when valve poppet 320 contacts valve seat 327. Collar 321 is slidably mounted to travel along shoulder 318, within cavity 323 of end plug 313 but is otherwise trapped by head 319 and valve poppet 320. Compression spring 322 is preferably mounted about shoulder 318 and trapped by collar 321 and end plug 313.

In operation, plunger 311 is housed within chamber 326 of fluid cylinder 304. End plug 305 comprises fluid passage 329, preferably but not necessarily in a centrally located position. Seal 328 forms a fluid-tight or hermetic seal between end plug 305 and fluid cylinder 304. End plug 305 is attached with respect to fluid cylinder 304, preferably but not necessarily with a threaded connection. Valve seat 327 is positioned near a top of fluid passage 329, with respect to the orientation shown in FIG. 4. When no fluid flows through fluid passage 329, valve stem 316 is at a lowest position and is forced into a seated positioned by pressurized gas within interior chamber 312. When valve assembly 300 is installed within chamber 326 and pressurized system fluid is introduced into chamber 326, fluidic forces act upon shoulder 318 and force valve stem 316 into a position wherein shoulder 318 abuts end plug 313, as shown in FIG. 4. In such position, head 319 does not contact valve poppet 320 or collar 321. The cavity of collar 321 is relatively important for absorbing impact forces when valve poppet 320 hits valve seat 327. As shown in FIG. 4, valve poppet 320 closes valve seat 327, due to forces of compression spring 322.

Figure 5:
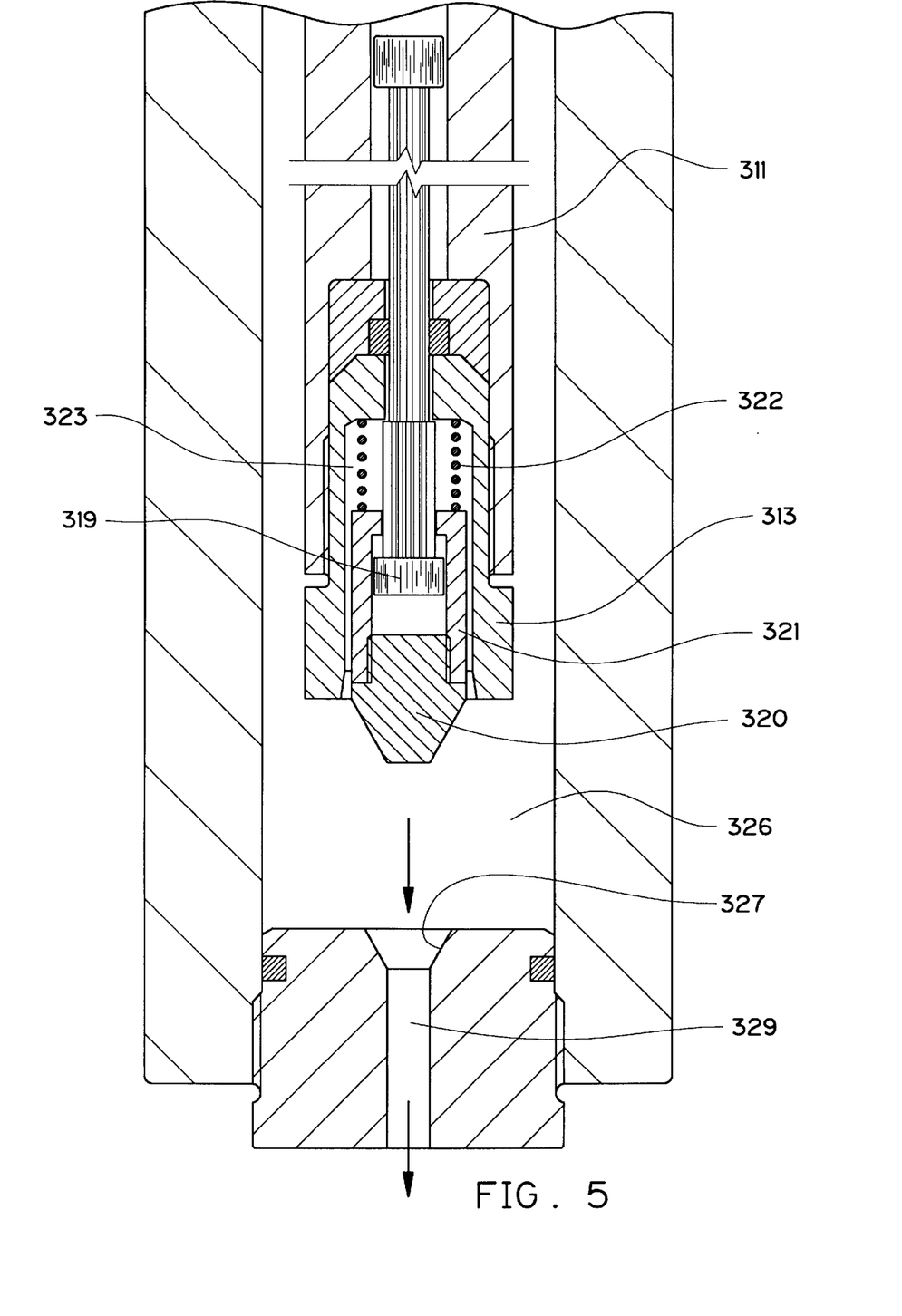
FIG. 5 is a partial cross-sectional view of the stem valve assembly shown in FIG. 4, but in an unseated position.

FIG. 5 shows stem valve assembly 300, according to the embodiment described in FIG. 4, but with valve poppet 320 in an unseated position with respect to valve seat 327, which thereby allows the system fluid within chamber 326 to quickly force stem valve assembly 300 upward to engage end plug 313 and plunger 311. Such components move together downward, with respect to the orientation shown in FIG. 5, in a rapid fashion along with the flow of system fluid. As shown in FIG. 5, compression spring 322 extends valve poppet 320 so that there is space between head 319 and valve poppet 320. As valve poppet 320 engages valve seat 327, impact forces cause valve poppet 320 to move upward within cavity 323 of end plug 313. Impact forces are absorbed by fluid within cavity 323 and by the forces of compression spring 322. Because valve seat 327 is sealed, the system fluid within chamber 326 has no outlet and thus also assists in decelerating plunger 311. With such energy-absorbing valve design, valve seat 327 can be opened and closed repeatedly without damaging valve poppet 320 or valve seat 327. During operation, valve poppet 320 does not contact head 319.

Stem valve assembly 300 according to invention is unique in several aspects. Stem valve assembly 300 is fluid actuated and the actuation point can be precisely designed. Stem valve assembly 300 can be used as a manual valve which requires a manual reset or can be used as an automatic valve with repeated cyclic valve action. Stem valve assembly 300 can be a fast-reacting dump valve through which fluid can flow with virtually no obstructions, because the valve elements quickly move away from the fluid flow. Such quick-release action is particularly important when using the valve of this invention for generating relatively high-speed fluid jets. If the valve poppet or any other part of the valve is positioned in a path of the high-speed flow of system fluid, the fluid jet coherence is destroyed, rendering the fluid jet useless for many applications. With the valve according to this invention, the fluid path to the nozzle is completely open and thus a very high-quality fluid jet is achieved. The valve poppet assembly of this invention can also be used in constructing on-off valves that are not fluid actuated. In such valves, an external lifting force is applied to the valve stem to dislodge the valve poppet.

Figure 6:
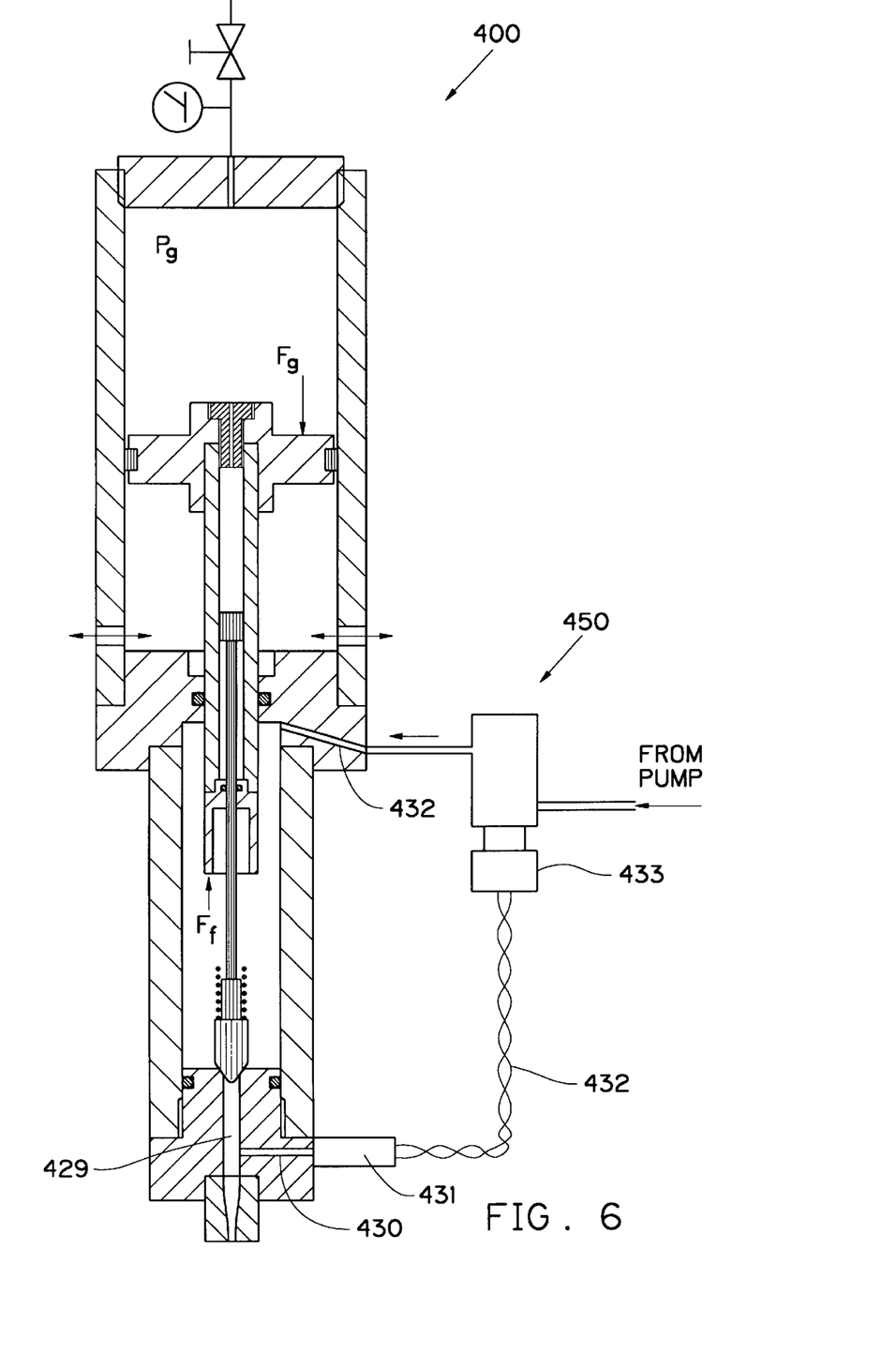
FIG. 6 is a partial cross-sectional view of a pulse generator having a remote control valve, according to one preferred embodiment of this invention.

FIG. 6 shows another preferred embodiment of this invention wherein the valve acts as pulse-jet generator 400 with remote control valve 450. As shown in FIG. 6, pulse-jet generator 400 is somewhat similar to the preferred embodiment shown in FIG. 3. Pulse-jet generator 400 preferably comprises fluid inlet 432 and fluid outlet 429. Fluid inlet 432 is in communication with an outlet of remote control valve 450, which is preferably an on-off type valve. Pulse-jet generator 400 also comprises sidelet 430 which is in communication with fluid outlet 429 and pressure transducer 431, which has electrical cable connection 432 routed to solenoid valve 433 that directly or indirectly operates the on-off action of remote control valve 450.

Pressure transducer 431 senses fluid pressure within sidelet 430 and emits an electrical signal to solenoid valve 433 to close remote control valve 450. When fluid pressure in sidelet 430 dissipates, pressure transducer 431 emits a signal to remote control valve 450 to reopen and to resume flow of high-pressure fluid from a pump to pulse-jet generator 400. Thus, remote control valve 450 can be located a distance away from pulse-jet generator 400.

Figure 7:
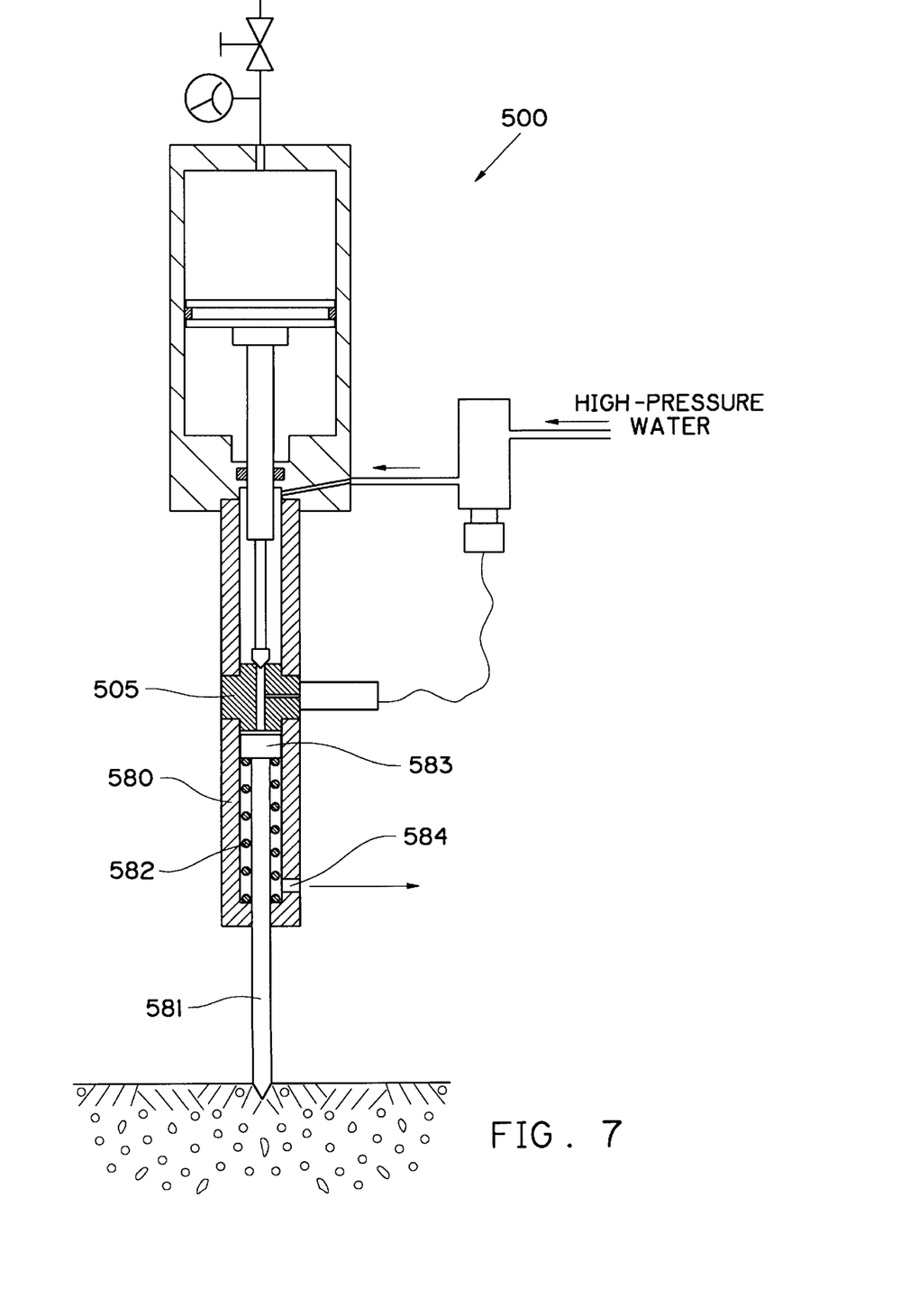
FIG. 7 is a partial cross-sectional view of a pulsed-jet powered apparatus, according to one preferred embodiment of this invention.

FIG. 7 shows another preferred embodiment of this invention wherein pulse-jet generator 500 is a powered apparatus that can be designed to perform a wide range of work tasks, such as creating fluid pressure high enough to fracture or break concrete, to drive piles, to drill rock, to bore soil, and to launch projectiles. Pulse-jet generator 500 is somewhat similar to the preferred embodiment shown in FIGS. 3 and 6. High-pressure end plug 505 is attached to tool cylinder 580 which houses a particular tool, such as chisel 581. Retaining spring 582 or another suitable tool-retaining device can be used to provide return action for chisel 581. Chisel 581 preferably has head 583 that forms a relatively tight fit within tool cylinder 580 but yet is mounted with enough tolerance to slide up and down within tool cylinder 580.

When a pulse jet, such as a pulsed waterjet is generated, the high-speed water enters tool cylinder 580 and drives chisel 581 downward in a rapid fashion, thus providing work to break concrete, for example. Because the pulsed waterjet is at a very high velocity, power transferred to chisel 581 is relatively high. For example, with a water input pressure of about 30,000 psi, chisel 581 of this invention can have a power output which exceeds power output offered by conventional hydraulic or pneumatic chisels or breakers. If chisel 581 is replaced with a reciprocating piston, the piston can be used to drive piles or anchors in construction applications. The piston can be constructed to rotate as well as to drive, such as to form a rotating drill. In such applications, the waterjet can lose power after driving the tool and can then discharge through port 584, and then be either dis-carded or recycled. The water can also be routed through a hollow tool, such as to the front of the tool for lubrication purposes, dust control purposes and other general purposes. Such embodiment of this invention is particularly useful in mining and construction operations.

Figure 8:
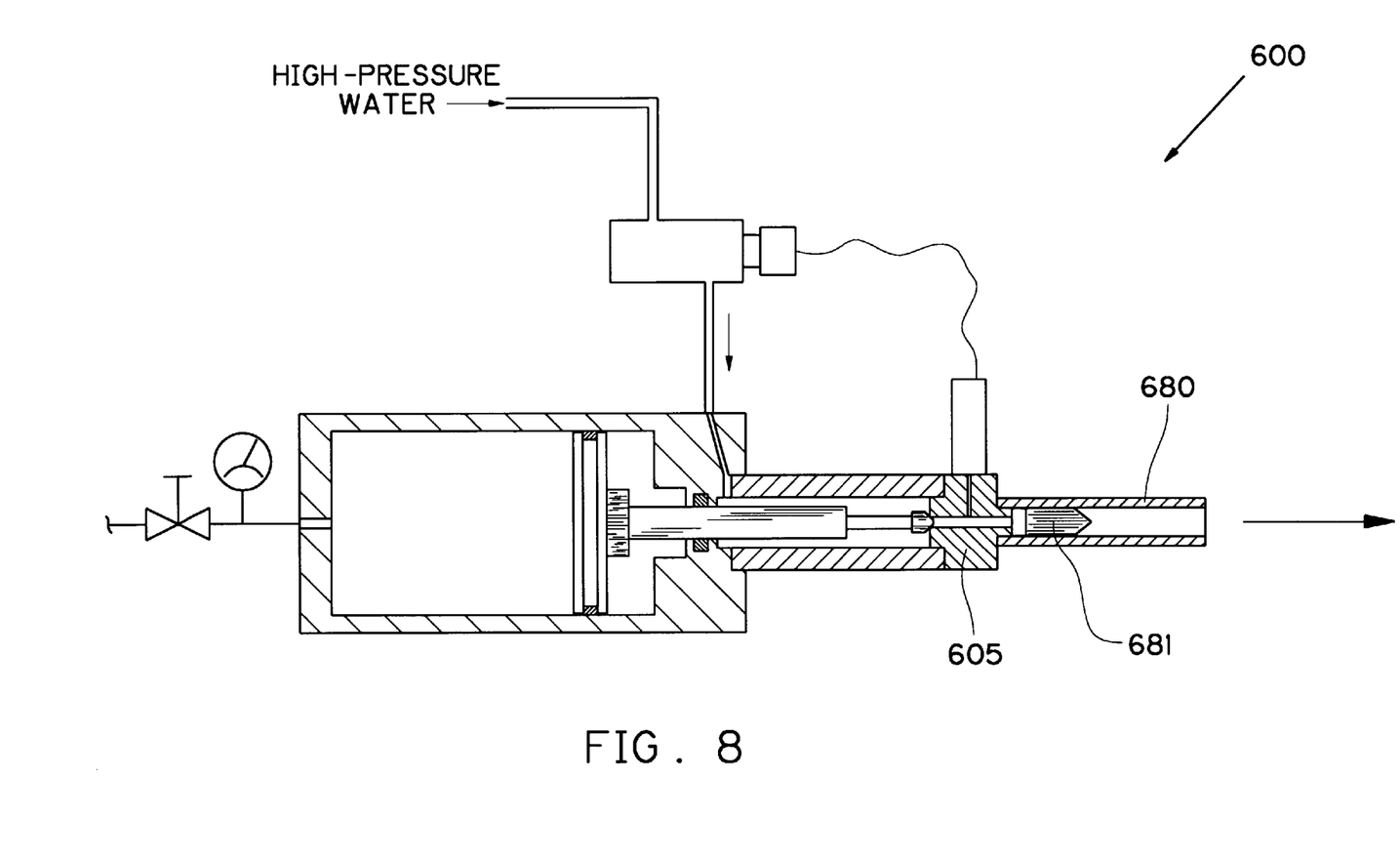
FIG. 8 is a partial cross-sectional view of a pulsed-jet generator, similar to those shown in FIGS. 3 and 6, having a launch tube, according to one preferred embodiment of this invention.

FIG. 8 shows another preferred embodiment of this invention which relates to a pulse-jet powered projectile launcher 600. As shown in FIG. 8, launcher 600 comprises a pulse-jet generator similar to the embodiments shown in FIGS. 3 and 6, but having launch tube 680 connected to outlet plug 605. The high-speed pulsed fluid jet, such as a waterjet, can be used to launch projectile 681, for performing various tasks.

Launcher 600 may be a part of a tool or can simply provide the working fluid for driving projectile 681. Because the pulse jet issued by launcher 600 is at very high velocity, a driving force for launching projectile 681 can be comparable to forces derived from explosives. Thus, the embodiment shown in FIG. 8 may have applications where explosives or detonation of fuel-air mixtures are not possible, such as in refineries or natural gas facilities. In some applications, projectile 681 can be a simple cone which is used to shield water from air resistance to thereby improve a delivery distance of pulsed waterjets. The cones can be used to increase the power of a pulse waterjet, for example, when fracturing materials. Launcher 600 can also be used to launch anchors, nails, capsules or any other relatively hard or even soft projectile.

Figure 9:
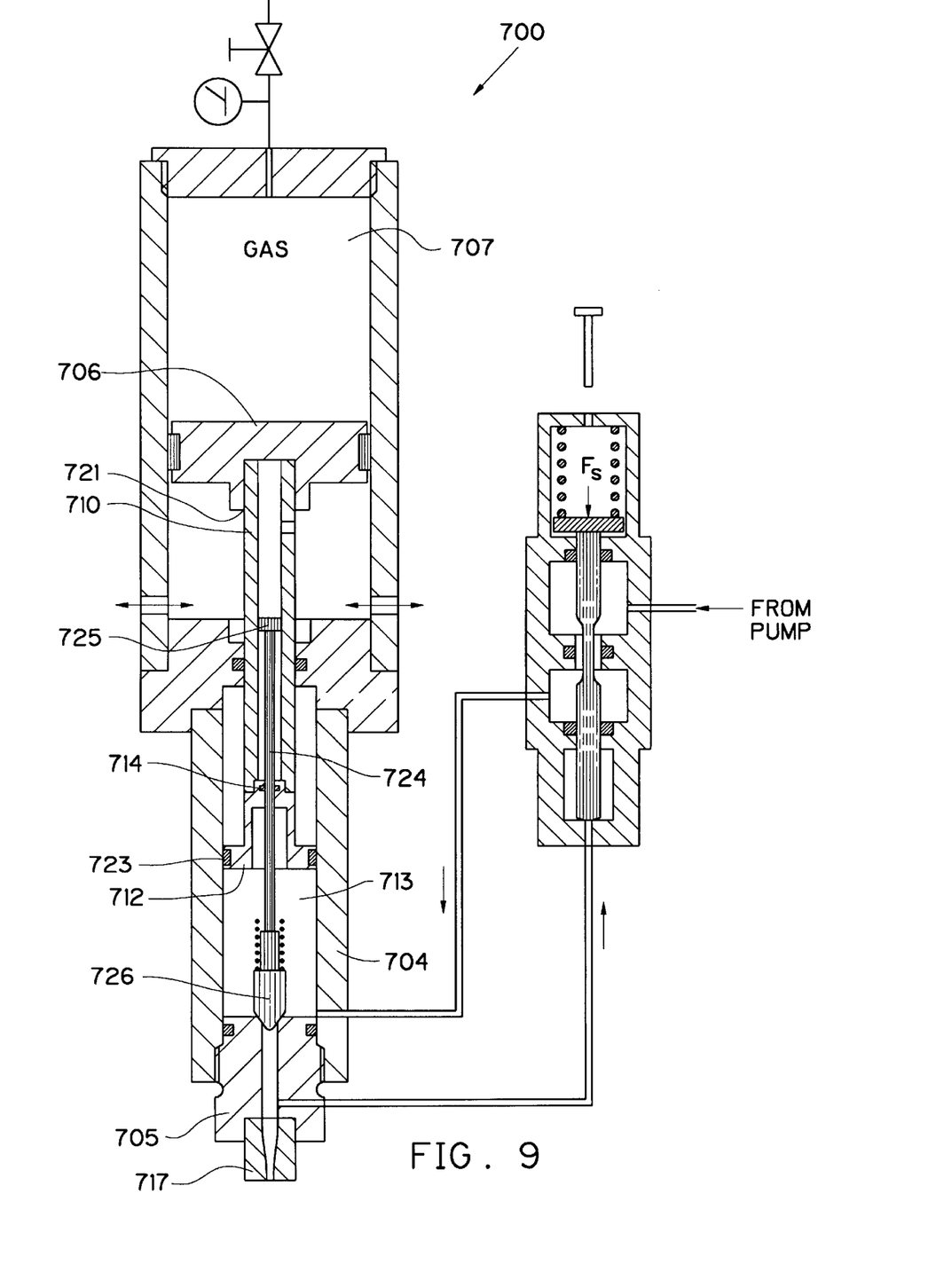
FIG. 9 is a partial cross-sectional view of a pulsed-jet generator, according to still another preferred embodiment of this invention.

FIG. 9 shows yet another preferred embodiment of this invention wherein pulse-jet generator 700 comprises internal valving components that can be easily removed from an outlet end of pulse-jet generator 700. As shown in FIG. 9, pulse-jet generator 700 comprises plunger 710 that forms a cavity. Plunger 710 is preferably mounted within cavity 721 of power piston 706. Plunger 710 can be easily removed from cavity 721. At an opposite end of plunger 710, end plug 712 is detachably mounted to plunger 710 for relatively easy removal. Seal 723 contacts an interior surface of high-pressure cylinder 704. When high-pressure fluid enters chamber 713, the pressurized fluid retains valve poppet 726 in a seated position and forces end plug 712 upward until end plug 712 forces plunger 710 and power piston 706 upward, relative to the orientation shown in FIG. 9, thereby compressing gas within gas chamber 707.

When end plug 712 reaches shoulder 725 of valve stem 724, valve poppet 726 becomes unseated and thus eliminates a fluid hold-down force which urges valve stem 724 upward. Simultaneously, the high-pressure fluid flows through valve port 727 and then through discharge nozzle 717, to generate a pulse jet. The embodiment shown in FIG. 9 provides easy removal of valve stem 724, for maintenance and interchangeability purposes. By removing end plug 705, valve poppet 726 and a corresponding valve poppet assembly are exposed. Pulling valve poppet 726 will pull out end plug 712 and plunger 710. According to such preferred embodiment, there is no need to disassemble cylinder 704 from any other component, thereby greatly enhancing and simplifying maintenance procedures. All moving parts, except for power piston 706, of pulse-jet generator 700 can be removed with plunger 710, so that a new assembly can be quickly inserted, which is particularly advantageous on-site.

It is apparent that many components are interchangeable between the preferred embodiments shown in FIGS. 1–9. It is also apparent that different combination of components can be used to achieve different results. The components described are preferably constructed of relatively hard materials, such as hardened metals, stainless steel, hard plastics or any other suitable material known to those skilled in the art.

EXAMPLE OF THE INVENTION

A pulse-jet generator similar to the embodiment of this invention as shown in FIG. 3 was constructed and the remaining discussion of this Example will refer to the element reference numerals shown in FIG. 3. Valve cylinder 201 was constructed of stainless steel and had an outside diameter of 3.5 inches and an inside diameter of 2.5 inches. Power piston 206 was constructed of bronze. An external accumulator, acting as a gas reservoir, communicated with inlet passage 218 of end plug 202. The gas accumulator was equipped with valves and a pressure gauge. The gas accumulator stored nitrogen at up to 5,000 psi, and to a maximum volume of one gallon.

Power piston 206 had a maximum travel of 6 inches. Plunger 210 was constructed of hardened stainless steel and had an outside diameter of 0.75 inches and an inside diameter of 0.25 inches and housed stem valve assembly 300, similar to that as shown in FIG. 4. Fluid cylinder 204 was constructed of hardened stainless steel and had an outside diameter of 2.25 inches and an inside diameter of 0.815 inches. Fluid cylinder 204 was capable of handling water up to 45,000 psi. Fluid cylinder 204 was attached to end block 203 with a threaded connection. End plug 305 was constructed of hardened stainless steel. Seal assemblies formed water-tight seals.

Fluid inlet 232 and fluid passage 229 were both positioned on end plug 305. Stem valve assembly 300 was constructed of stainless steel. Valve stem 316 was 0.125 inches in diameter and valve poppet 320 was 0.350 inches in diameter. Fluid passage 329 was 0.125 inches in diameter and valve port 327 was tapered at an angle of about 60°.

Control valve assembly 250, similar to that shown in FIG. 3, was constructed and used. Valve stem 259 was 0.125 inches in diameter and handled water at pressures up to 45,000 psi. Reset spring 264 was used to reset valve stem 259 and valve stem 259 was easily moved by fluid at a pressure above 2,000 psi.

High-pressure pulsed generator 200 was designed for use with water and was used with a fluid pressure intensifier capable of generating water pressures up to 45,000 psi. A ratio of the cross-sectional area of power piston 206 to plunger 210 had an area ratio of 11:1. The forces across power piston 206 and plunger 210 were equalized by setting the system water pressure at 11 times the gas pressure $P_g$. Nitrogen was used as the gas and the accumulator was filled to a pressure of about 2,000 psi. Thus, the system water pressure was used at above about 22,000 psi. At pressures below 22,000 psi, plunger 210 did not move.

High-pressure pulsed generator was installed with jet nozzle 217 having a 0.035 inch diameter sapphire orifice and was fed with water from a pressure intensifier at 35,000 psi. Very quickly, a powerful pulsed waterjet was issued at jet nozzle 217, repeatedly at a frequency of roughly four pulses per second. Such frequency was determined by the output of the pressure intensifier and the internal volume of the pulsed-jet generator. The pulsed-jet generator stopped when water stopped flowing from the pressure intensifier. The static pressure of the water within the pulsed-jet generator remained at 35,000 psi, and maintained a pressure close to 35,000 psi during discharge as the gas accumulator used was reasonably large in view of the internal volume of the pulse-jet generator. Jet nozzle 217 issued a water jet which was very coherent and packed with considerable energy, capable of fracturing rock and concrete even though no effort was spent to design or shape jet nozzle 217 in a manner that would enhance the discharge speed of the fluid.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An apparatus for converting continuous fluid flow to intermittent fluid flow, the apparatus comprising:

a valve cylinder having a cylindrical cavity, a piston slidably and sealably mounted within said cavity, an energy storage device urging said piston in a first direction, a plunger having a cylindrical internal chamber, said plunger having a first end portion fixed with respect to said piston and a second end portion opposite said first end portion, an end plug sealably mounted with respect to said second end portion, said end plug having a plug bore;

a fluid cylinder having a valve chamber in communication with a pressurized fluid source;

a valve stem slidably mounted within said internal chamber, said plug bore and said valve chamber, said valve stem having a shoulder positioned within said internal chamber;

a valve poppet attached to said valve stem opposite said shoulder;

an outlet plug sealably mounted with respect to said fluid cylinder, said outlet plug having a discharge passage with one end exposed to said valve chamber and an opposite end exposed to an exterior of said outlet plug; and a spring mounted between said plunger end plug and said valve poppet.

2. An apparatus according to claim 1 further comprising two end blocks, one of said end blocks attached to said fluid cylinder and having a block bore, said plunger slidably and sealably mounted within said block bore, and an other of said end blocks having an inlet passage in communication with said valve cylinder and said exterior.

3. An apparatus according to claim 1 wherein said energy storage device comprises at least one compression spring exerting a bias force on said piston.

4. An apparatus according to claim 1 wherein said energy storage device comprises a compressed gas in communication with said cavity of said valve cylinder, and said compressed gas exerting a pressure force on said piston.

5. An apparatus according to claim 4 further comprising an anchor bolt fixing said plunger with respect to said piston, and said anchor bolt having a fluid passage in communication with said compressed gas and said internal chamber of said plunger.

6. An apparatus according to claim 1 wherein said plunger has a smooth cylindrical external surface and a smooth cylindrical internal surface at least partially forming said internal chamber.

7. An apparatus according to claim 1 wherein at least one of said shoulder and said valve poppet is removably attached to said valve stem.

8. An apparatus according to claim 1 wherein said end plug of said plunger has a cylindrical bore, and a cylindrical external surface of said valve poppet intimately fits within said cylindrical bore.

9. An apparatus according to claim 1 wherein said piston has a first cross-sectional area, said plunger has a second cross-sectional area, and an intensification ratio of said first cross-sectional area to said second cross-sectional area is such that an initial charge pressure and a maximum operating pressure of compressed gas within said cavity does not exceed a pressure of fluid within said valve chamber divided by said intensification ratio.

10. An apparatus according to claim 1 further comprising a control valve regulating flow of pressurized fluid to said valve chamber, said control valve being in a normally open condition and closing upon receiving a signal from the apparatus.

11. An apparatus according to claim 10 wherein said signal is a function of said pressurized fluid flowing through said discharge passage.

12. An apparatus according to claim 11 further comprising a nozzle mounted to said outlet plug, and said nozzle having an orifice that generates a high-speed fluid jet.

13. An apparatus according to claim 10 wherein a pressure transducer is mounted to sense a fluid pressure at said discharge passage and said pressure transducer emits said signal as an electrical output.

14. An apparatus according to claim 1 further comprising an adapter mounted with respect to said outlet plug, and a power tool mounted within said adapter.

15. An apparatus according to claim 1 further comprising a launch tube mounted with respect to said outlet plug, and a projectile slidably mounted within said launch tube.

* * * * *